(12) United States Patent
Han

(10) Patent No.: US 11,757,318 B2
(45) Date of Patent: Sep. 12, 2023

(54) ROTOR AND MOTOR HAVING SAME

(71) Applicant: LG INNOTEK CO., LTD., Seoul (KR)

(72) Inventor: Ji Hoon Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 289 days.

(21) Appl. No.: 17/261,120

(22) PCT Filed: Jul. 3, 2019

(86) PCT No.: PCT/KR2019/008099
§ 371 (c)(1),
(2) Date: Jan. 18, 2021

(87) PCT Pub. No.: WO2020/032395
PCT Pub. Date: Feb. 13, 2020

(65) Prior Publication Data
US 2021/0313855 A1    Oct. 7, 2021

(30) Foreign Application Priority Data

Aug. 8, 2018  (KR) .................. 10-2018-0092178

(51) Int. Cl.
*H02K 1/28* (2006.01)
*H02K 1/278* (2022.01)
*H02K 7/00* (2006.01)

(52) U.S. Cl.
CPC ............... *H02K 1/28* (2013.01); *H02K 1/278* (2013.01); *H02K 7/003* (2013.01); *H02K 2213/03* (2013.01)

(58) Field of Classification Search
CPC .......... H02K 1/28; H02K 1/278; H02K 7/003; H02K 2213/03

(Continued)

(56) References Cited

U.S. PATENT DOCUMENTS 6,265,802 B1   7/2001  Getschmann
2006/0138877 A1  6/2006  Akabane
(Continued)

FOREIGN PATENT DOCUMENTS

DE   20 2017 100 697 U1   3/2017
EP       2 209 182 A2     7/2010
(Continued)

OTHER PUBLICATIONS

International Search Report dated Oct. 8, 2019 in International Application No. PCT/KR2019/008099.
(Continued)

*Primary Examiner* — Terrance L Kenerly
(74) *Attorney, Agent, or Firm* — Saliwanchik, Lloyd & Eisenschenk

(57) ABSTRACT

One embodiment of the present invention relates to a rotor and a motor having same, the rotor comprising: a rotor core; and a plurality of magnets arranged to be spaced apart from each other on an outer circumferential surface of the rotor core, wherein the rotor core includes: a body; and protrusions protruding obliquely inward at a predetermined angle from an inner circumferential surface of the body, wherein a predetermined gap (G1) is formed between the inner circumferential surface of the body and the end of each of the protrusions. Accordingly, the rotor and the motor having the same may minimize the amount of change in the outer circumferential surface of the rotor core by using the protrusions. As a result, it is possible to inhibit separation of the magnets attached to the outer circumferential surface of the rotor core.

17 Claims, 12 Drawing Sheets

(58) Field of Classification Search
USPC .................. 310/156.08, 216.087, 216.051
See application file for complete search history.

(56) References Cited

U.S. PATENT DOCUMENTS

| | | | | |
|---|---|---|---|---|
| 2014/0265699 | A1* | 9/2014 | Morikawa | H02K 1/278 |
| | | | | 310/156.21 |
| 2017/0207671 | A1* | 7/2017 | Paul | H02K 1/28 |

FOREIGN PATENT DOCUMENTS

| | | | | | |
|---|---|---|---|---|---|
| JP | 9-93844 | A | | 4/1997 | |
| JP | 2007-181270 | A | | 7/2007 | |
| JP | 2008-236895 | A | | 10/2008 | |
| JP | 2013-110802 | A | | 6/2013 | |
| JP | 2014-176218 | A | | 9/2014 | |
| JP | 2015-47051 | A | | 3/2015 | |
| JP | 2017-521992 | A | | 8/2017 | |
| KR | 10-2009-0105958 | A | | 10/2009 | |
| KR | 10-2012-0078913 | A | | 7/2012 | |
| KR | 10-2013-0011664 | A | | 1/2013 | |
| KR | 10-2017-0045998 | A | | 4/2017 | |
| KR | 20170048015 | | * | 5/2017 | H02K 1/28 |
| WO | WO-2018/056359 | A1 | | 3/2018 | |

OTHER PUBLICATIONS

Supplementary European Search Report dated Aug. 17, 2021 in European Application No. 19847862.0.
Office Action dated Jun. 2, 2023 in Korean Application No. 10-2018-0092178.
Office Action dated Apr. 25, 2023 in Japanese Application No. 2021-505209.

* cited by examiner

ROTOR AND MOTOR HAVING SAME

CROSS-REFERENCE TO RELATED APPLICATIONS

This application is the U.S. national stage application of International Patent Application No. PCT/KR2019/008099, filed Jul. 3, 2019, which claims the benefit under 35 U.S.C. § 119 of Korean Application No. 10-2018-0092178, filed Aug. 8, 2018, the disclosures of each of which are incorporated herein by reference in their entirety.

TECHNICAL FIELD

The present invention relates to a rotor and a motor including the same.

BACKGROUND ART

Motors are apparatuses configured to convert electrical energy into mechanical energy to obtain rotational forces and are widely used in vehicles, home appliances, industrial machines, and the like.

A motor may include a housing, a shaft, a stator disposed in the housing, and a rotor installed at an outer circumferential surface of the shaft. In this case, the stator of the motor electrically interacts with the rotor to cause rotation of the rotor. In addition, the shaft also rotates according to the rotation of the rotor.

Particularly, the motor may be used for an apparatus configured to secure steering stability of a vehicle. For example, the motor may be used as a vehicle motor in an electronic power steering (EPS) system, and the like.

In addition, the motor may be used in a clutch actuator.

A plurality of magnets are installed on the rotor, and the rotor is classified according to a magnet installation method as an interior permanent magnet (IPM) type rotor in which magnets are insertion-coupled to an inner portion of a rotor core or a surface permanent magnet (SPM) type rotor in which magnets are attached to a surface of a rotor core.

In a case in which a motor includes an SPM type rotor, since magnets are coupled to a rotor core by only bonding, when a bonding force is reduced, a problem occurs in which the magnets are separated from the rotor core.

Particularly, when a shaft is press-fitted to a hole formed in the rotor core, a press-fitting force is applied to the rotor core in a radial direction. Accordingly, an outer circumferential surface of the rotor core, that is, an outer diameter of the rotor core, is changed by the press-fitting force. In addition, a problem in that the magnets attached to the outer circumferential surface of the rotor core are separated therefrom occurs due to a change in the outer diameter and the press-fitting force.

TECHNICAL PROBLEM

The present invention is directed to providing a rotor, in which separation of a magnet attached to an outer circumferential surface of a rotor core is inhibited using a protrusion configured to buffer an amount of change in an outer diameter of the rotor core due to press-fitting of a shaft, and a motor including the same.

Objectives to be solved by the present invention are not limited to the above-described objectives, and other objectives which are not described above will be clearly understood by those skilled in the art from the following specification.

TECHNICAL SOLUTION

One aspect of the present invention provides a rotor including a rotor core, and a plurality of magnets disposed on an outer circumferential surface of the rotor core to be spaced apart from each other, wherein the rotor core includes a body, and a protruding portion obliquely protruding inward from an inner circumferential surface of the body at a predetermined angle, and a predetermined gap (G1) is formed between the inner circumferential surface of the body and an end portion of the protruding portion.

The protruding portion may include a first protrusion and a second protrusion which obliquely protrude from the inner circumferential surface of the body at predetermined angles, and the first protrusion and the second protrusion may be symmetrically disposed on the basis of a virtual line connecting a center of the rotor core and a center of the magnet.

Alternatively, the protruding portion may include a first protrusion and a second protrusion which obliquely protrude from the inner circumferential surface of the body at predetermined angles, and an end portion of the first protrusion and an end portion of the second protrusion may protrude in directions to be spaced apart from each other in a circumferential direction.

The end portion of the first protrusion and the end portion of the second protrusion may form a first angle ($\theta 1$) based on a center (C) of the rotor core, one corner and the other corner of the magnet may form a second angle ($\theta 2$) based on the center (C) of the rotor core, and the first angle ($\theta 1$) may be less than the second angle ($\theta 2$).

A center of the magnet and a center between the first protrusion and the second protrusion may be disposed on the same radial line in the circumferential direction, and a width of the magnet may be greater than a width of the protruding portion.

The rotor core may further include a hole formed in the body.

The hole may be disposed between the protruding portion and the magnet in a radial direction.

The end portion of the first protrusion and the end portion of the second protrusion may form a first angle ($\theta 1$) based on a center (C) of the rotor core, and one corner and the other corner of the hole may form a third angle ($\theta 3$) based on the center (C) of the rotor core, and the first angle ($\theta 1$) may be greater than the third angle ($\theta 3$).

A center of the hole may be disposed on a virtual line (L) connecting a center of the magnet and the center of the rotor core.

Alternatively, a width of the hole may be the same as a width between one point and another point at which the protruding portion meets the inner circumferential surface of the body in the circumferential direction.

A height (H1) of the protruding portion may be less than a height (H2) of the body based on a lower surface of the body in an axial direction.

The height (H2) of the body may be 1.9 to 2.0 times the height (H1) of the protruding portion.

The rotor may further include a first can and a second can which cover an upper portion and a lower portion of the rotor core, to which the magnets are attached, respectively, wherein the second can may be disposed to overlap the protruding portion in a radial direction.

The rotor core may further include a groove concavely formed inward from an outer circumferential surface of the body, and a width of the groove may be less than a width of the magnet.

A predetermined gap (G2) may be formed between an inner side surface of the magnet and an inner surface of the groove.

The rotor core may further include guides protruding outward from the outer circumferential surface thereof, and the magnet may be disposed between the guides.

Another aspect of the present invention provides a motor including a shaft, a rotor in which the shaft is disposed in a central portion thereof, and a stator disposed outside the rotor, wherein the rotor includes a rotor core and a plurality of magnets disposed on an outer circumferential surface of the rotor core to be spaced apart from each other, the rotor core includes a body and a protruding portion obliquely protruding inward from an inner circumferential surface of the body at a predetermined angle, and a predetermined gap (G1) is formed between the inner circumferential surface of the body and an end portion of the protruding portion.

An outer circumferential surface of the shaft may be in contact with the protruding portion, and when the shaft is inserted, the gap (G1) may be reduced.

A height (H1) of the protruding portion may be less than a height (H2) of the body based on a lower surface of the body in an axial direction.

The protruding portion may include a first protrusion and a second protrusion obliquely protruding from the inner circumferential surface of the body at a predetermined angle, and an end portion of the first protrusion and an end portion of the second protrusion may protrude in directions to be spaced apart from each other in a circumferential direction.

Each of the end portion of the first protrusion and the end portion of the second protrusion may be formed to have a curved surface, and the shaft may be in line-contact with the first protrusion and the second protrusion in an axial direction.

ADVANTAGEOUS EFFECTS

According to embodiments, in a rotor having the above-described structure and a motor including the same, an amount of change in an outer circumferential surface of a rotor core can be minimized using a protrusion. Accordingly, separation of a magnet attached to the outer circumferential surface of the rotor core can be inhibited.

In addition, in the rotor core, the change in the outer circumferential surface of the rotor core due to press-fitting of the shaft can be minimized using a hole.

In addition, in the rotor core, the change in the outer circumferential surface of the rotor core due to the press-fitting of the shaft can be minimized using a groove.

In addition, since a shape of a first can is implemented to be the same as a shape of a second can, production costs of the cans can be reduced. In addition, separation of the magnet can be inhibited using the first can and the second can.

Useful advantages and effects of the embodiments are not limited to the above-described contents and will be more easily understood from descriptions of the specific embodiments.

MODES OF THE INVENTION

Figure 1:
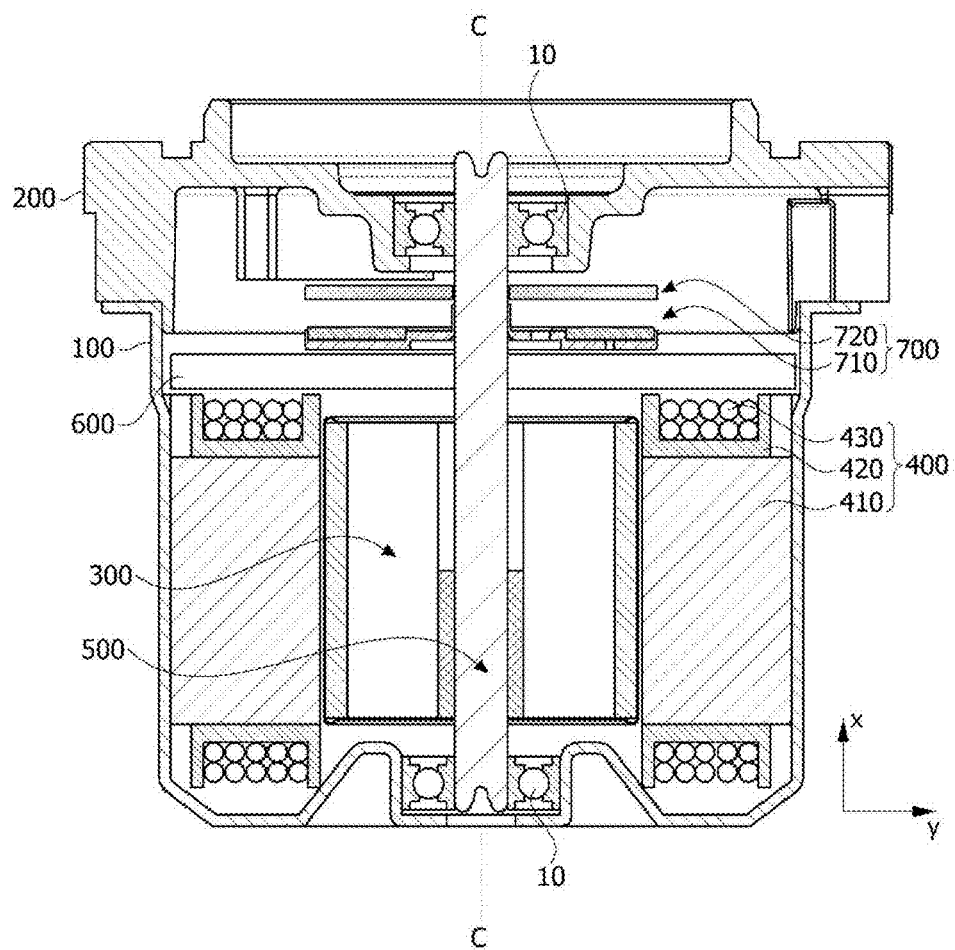
FIG. 1 is a view illustrating a motor according to an embodiment.

Hereinafter, exemplary embodiments of the present invention will be described in detail with reference to the accompanying drawings.

However, the technical spirit of the present invention is not limited to some embodiments which will be described and may be realized using various other embodiments, and one or more components of the embodiments may be selectively coupled, substituted, and used to realize the technical spirit within the range of the technical spirit.

In addition, unless clearly and specifically defined otherwise by context, all terms (including technical and scientific terms) used herein can be interpreted in a sense generally understandable to those skilled in the art, and meanings of generally used terms, such as those defined in commonly used dictionaries, will be interpreted in consideration of contextual meanings of the related technology.

In addition, the terms used in the embodiments of the present invention are considered in a descriptive sense and not to limit the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and the essence, order, and the like of the element are not limited by the terms.

It should be understood that, when an element is referred to as being "connected or coupled" to another element, such a description may include both a case in which the element is directly connected or coupled to another element, and a case in which the element is connected or coupled to another element with still another element disposed therebetween.

In addition, in a case in which any one element is described as being formed or disposed "on or under" another element, such a description includes both a case in which the two elements are formed or disposed to be in direct contact with each other and a case in which one or more other elements are interposed between the two elements. In addition, when one element is described as being formed "on or under" another element, such a description may include a case in which the one element is formed at an upper side or a lower side with respect to another element.

Hereinafter, the embodiments will be described in detail with reference to the accompanying drawings, and components that are the same or correspond to each other are denoted by the same reference numeral regardless of the figure number, and redundant description thereof will be omitted.

FIG. 1 is a view illustrating a motor according to an embodiment. An x-direction of FIG. 1 denotes an axial direction, and a y-direction denotes a radial direction. In this case, the axial direction is perpendicular to the radial direction. Here, the axial direction may be a longitudinal direction of a shaft 500.

Referring to FIG. 1, the motor 1 according to the embodiment may include a housing 100 in which an opening is formed at one side thereof, a cover 200 disposed on the housing 100, a rotor 300 coupled to a shaft 500, a stator 400 disposed in the housing 100, the shaft 500 configured to rotate with the rotor 300, a bus bar 600 disposed above the stator 400, and a sensor part 700 configured to detect rotation of the rotor 300.

The motor 1 may be used in a clutch actuator.

Alternatively, the motor 1 may be a motor used in an electronic power steering (EPS) system. The EPS system assists a steering force using a driving force of the motor to secure turning stability and quickly provide a restoring force so that a driver may safely drive a vehicle.

The housing 100 and the cover 200 may form an exterior of the motor 1. In addition, an accommodation space may be formed by coupling the housing 100 and the cover 200. Accordingly, as illustrated in FIG. 1, the rotor 300, the stator 400, the shaft 500, the bus bar 600, the sensor part 700, and the like may be disposed in the accommodation space. In this case, the shaft 500 is rotatably disposed in the accommodation space. Accordingly, the motor 1 may further include bearings 10 disposed at upper and lower portions of the shaft 500.

The housing 100 may be formed in a cylindrical shape. In addition, the housing 100 may accommodate the rotor 300, the stator 400, and the like therein. In this case, a shape or material of the housing 100 may be variously changed. For example, the housing 100 may be formed of a metal material which withstands even high temperatures well.

The cover 200 may be disposed on an open surface of the housing 100, that is, an upper portion of the housing 100, to cover the opening of the housing 100.

The rotor 300 may be disposed inside the stator 400, and the shaft 500 may be coupled to a central portion of the rotor 300 in a press-fitting manner. In this case, the rotor 300 may be rotatably disposed in the stator 400. Here, the term "inside" may denote a direction toward a center C in the radial direction, and the term "outside" may denote a direction opposite to "inside."

Figure 2:
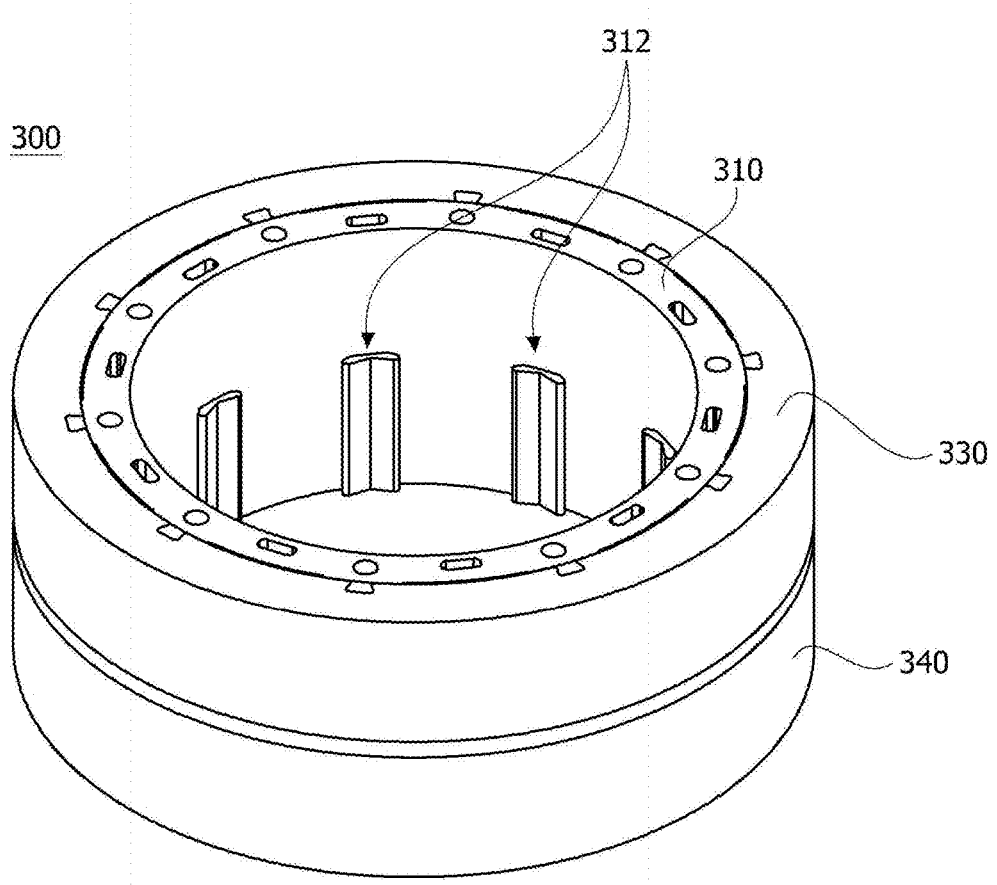
FIG. 2 is a perspective view illustrating a rotor of the motor according to the embodiment.
Figure 3:
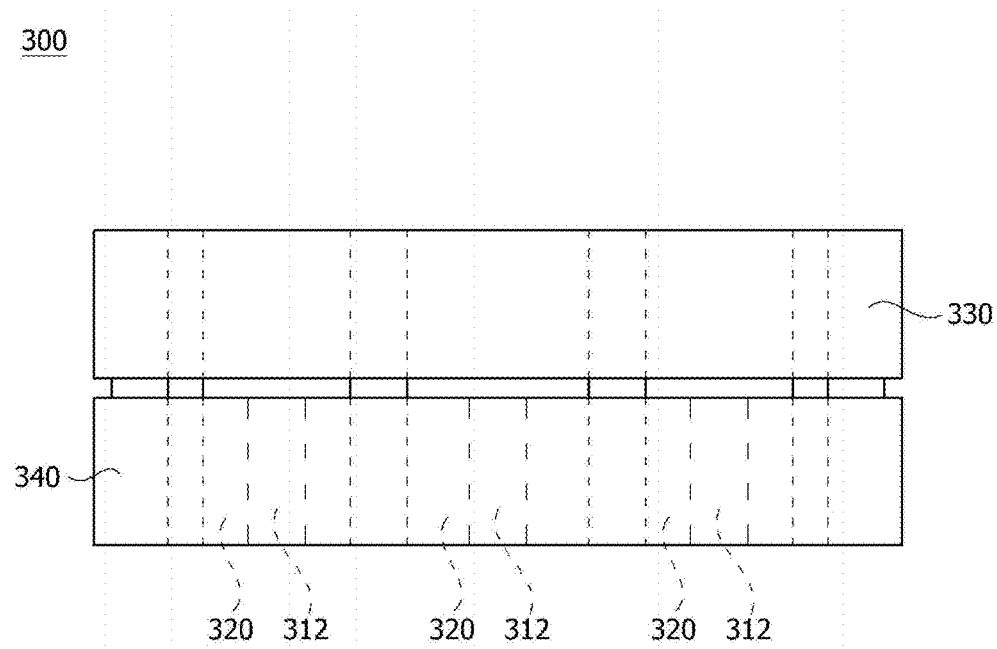
FIG. 3 is a side view illustrating the rotor of the motor according to the embodiment.

FIG. 2 is a perspective view illustrating the rotor of the motor according to the embodiment, and FIG. 3 is a side view illustrating the rotor of the motor according to the embodiment.

Referring to FIGS. 2 and 3, the rotor 300 may include a rotor core 310 and a plurality of magnets 320 disposed on an outer circumferential surface of the rotor core 310. In addition, the rotor 300 may further include a first can 330 disposed on an upper portion of the rotor core 310 to which the magnets 320 are attached and a second can 340 disposed on a lower portion of the rotor core 310 to which the magnets 320 are attached.

Figure 4:
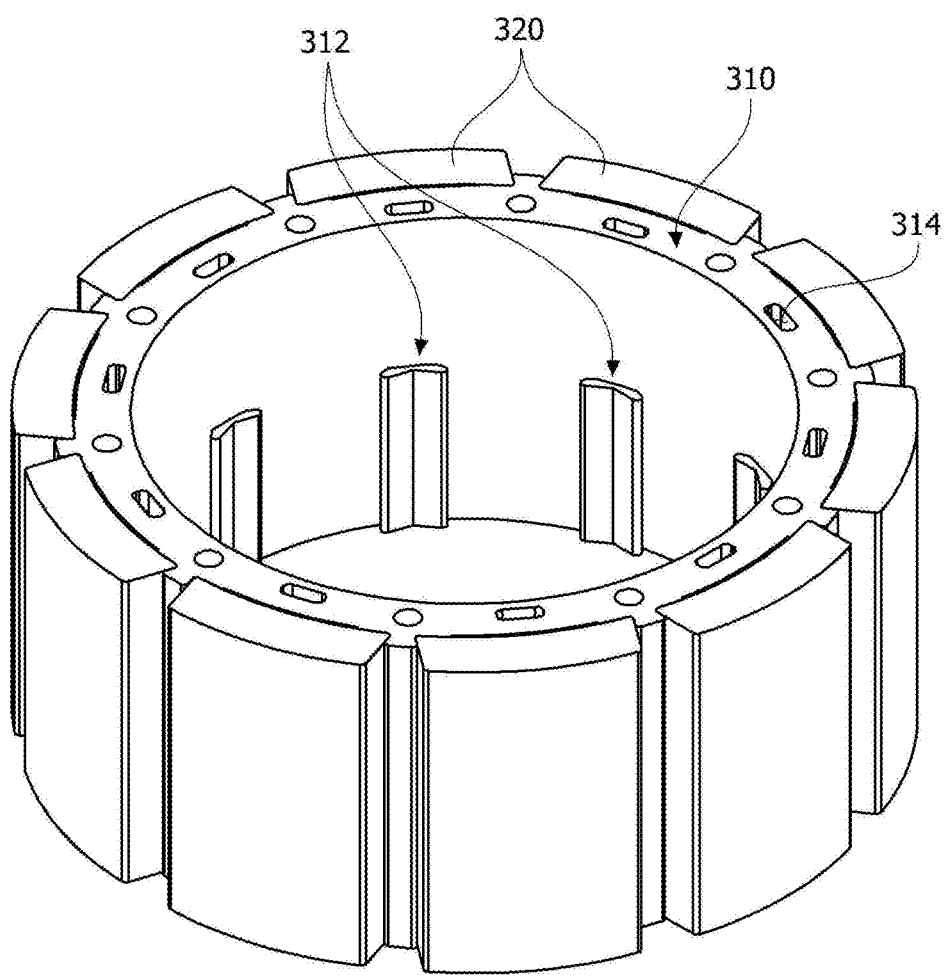
FIG. 4 is a perspective view illustrating a rotor core and magnets of the rotor of the motor according to the embodiment.
Figure 5:
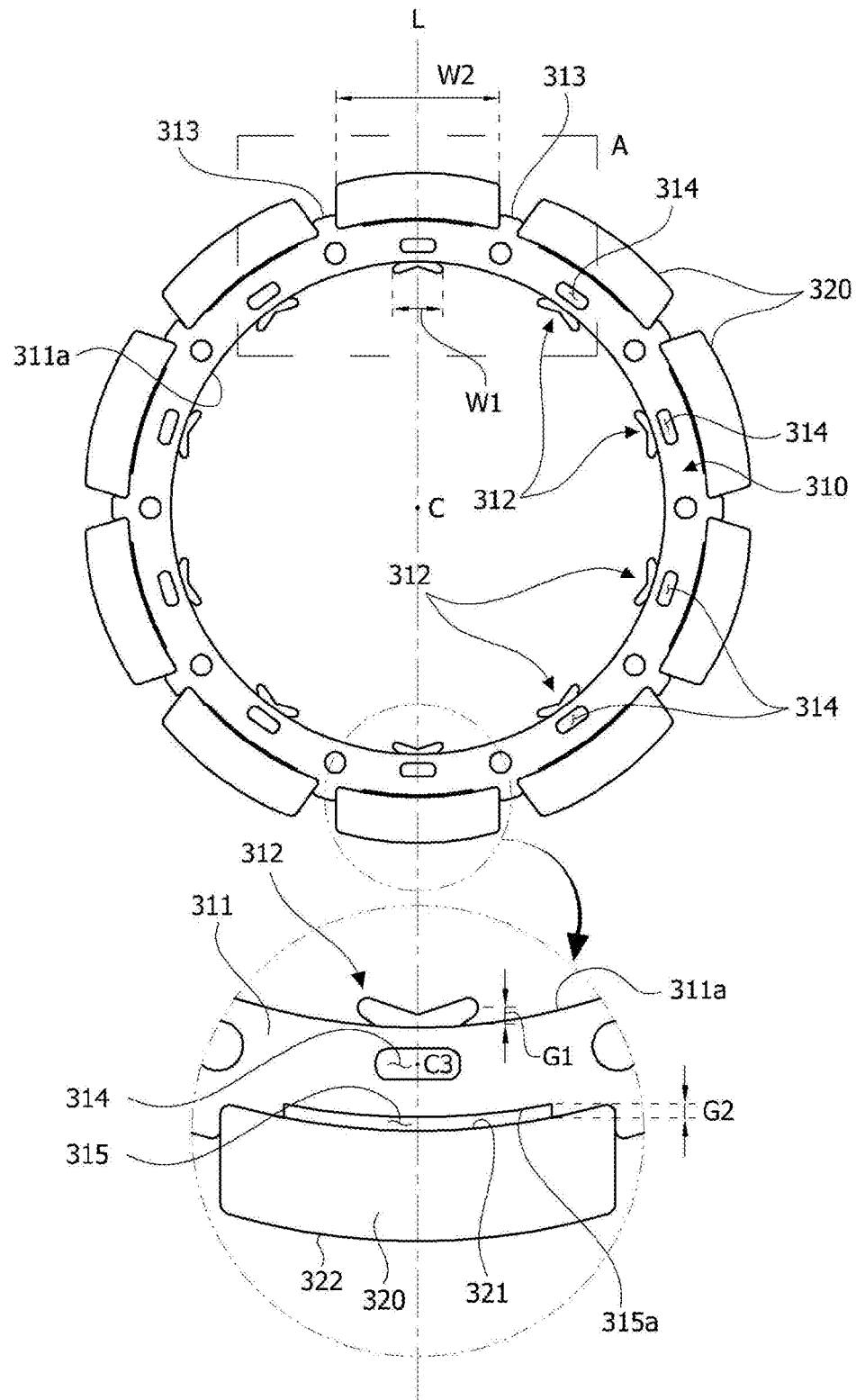
FIG. 5 is a plan view illustrating the rotor core and the magnets of the rotor of the motor according to the embodiment.
Figure 6:
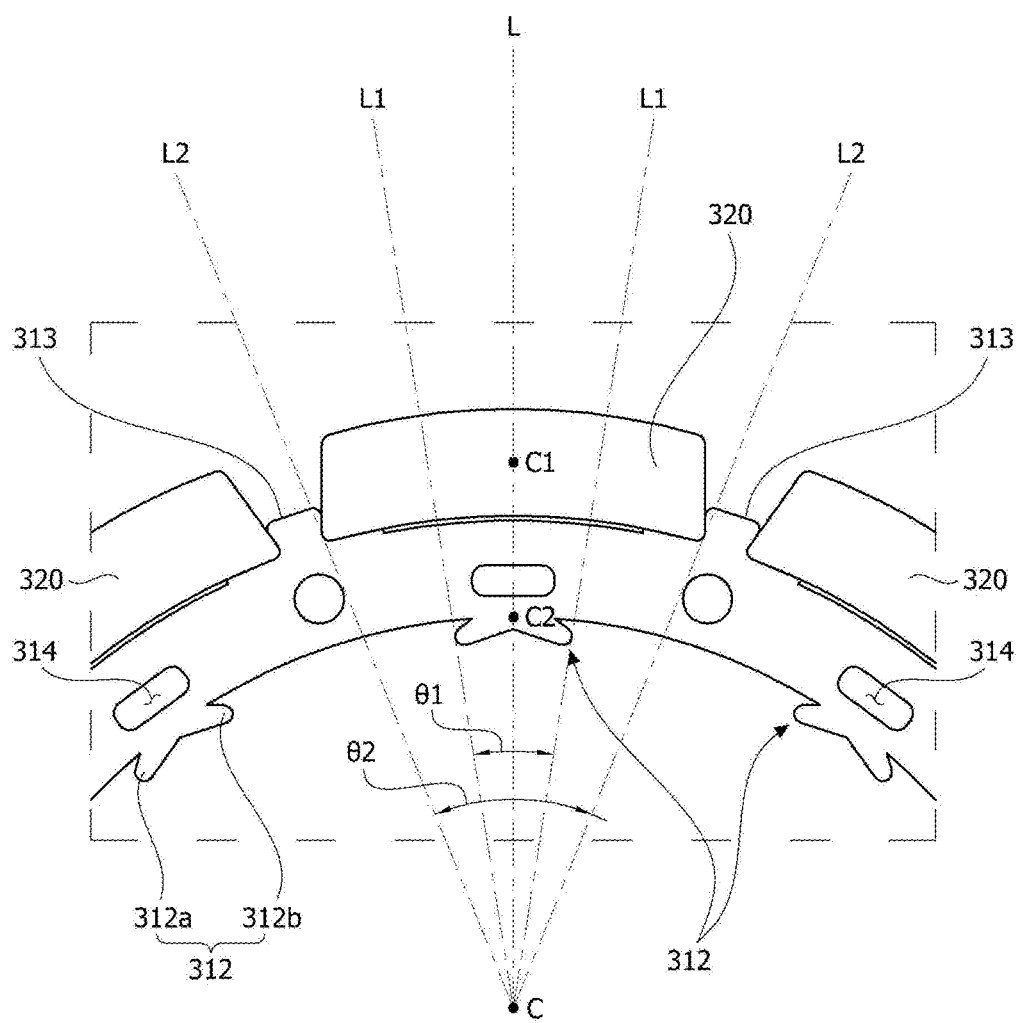
FIG. 6 is an enlarged view illustrating region A of FIG. 5.

FIG. 4 is a perspective view illustrating the rotor core and the magnets of the rotor of the motor according to the embodiment, FIG. 5 is a plan view illustrating the rotor core and the magnets of the rotor of the motor according to the embodiment, and FIG. 6 is an enlarged view illustrating region A of FIG. 5.

Referring to FIGS. 4 to 6, the plurality of magnets 320 may be disposed on the outer circumferential surface of the rotor core 310 in a circumferential direction.

As illustrated in FIGS. 4 and 5, the plurality of magnets 320 may be disposed on the outer circumferential surface of the rotor core 310 to be spaced apart from each other at preset intervals. In this case, the magnets 320 may be referred to as rotor magnets or drive magnets.

The rotor core 310 may be formed in a form in which a plurality of circular thin steel plates are stacked or in a single cylindrical form. A hole coupled to the shaft 500 may be formed in a center C of the rotor core 310.

Figure 7:
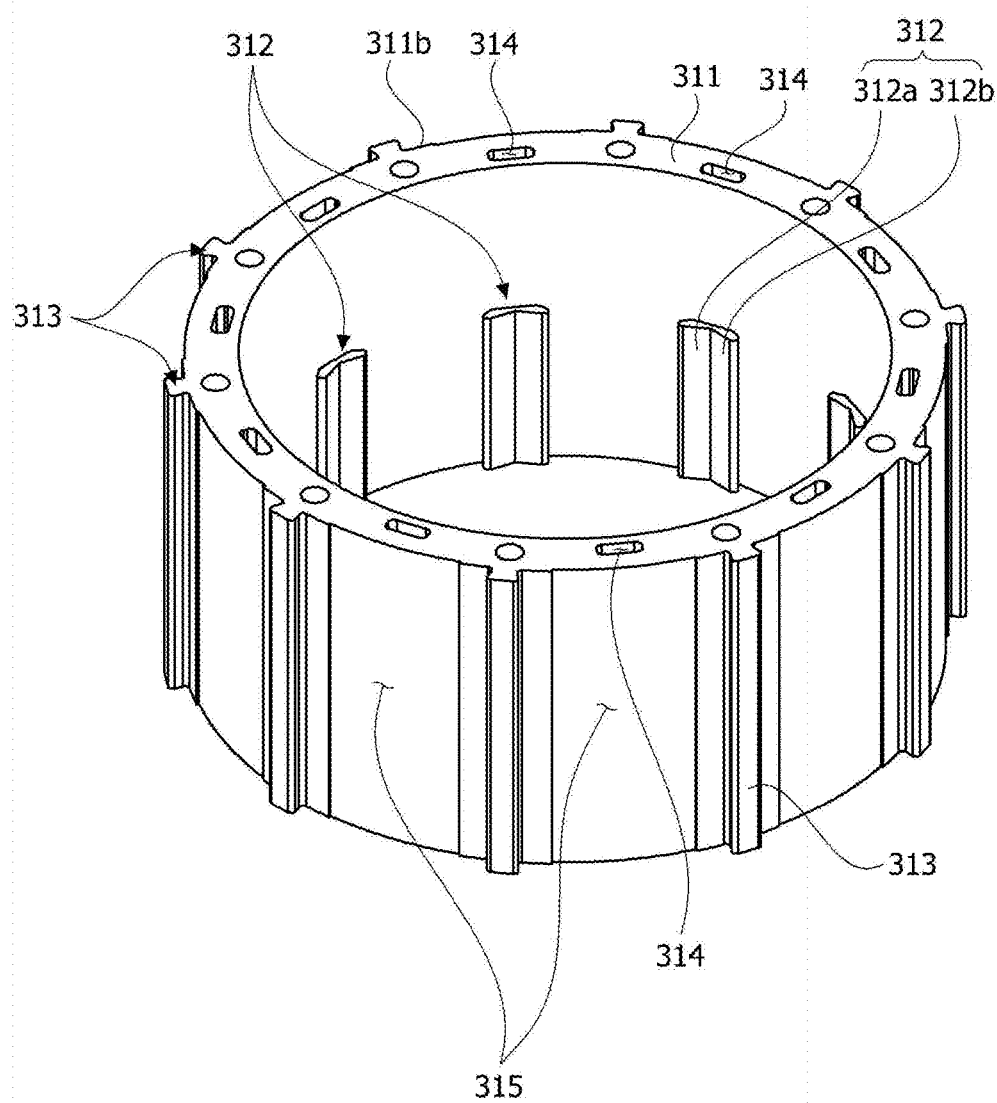
FIG. 7 is a perspective view illustrating the rotor core of the rotor disposed in the motor according to the embodiment.
Figure 8:
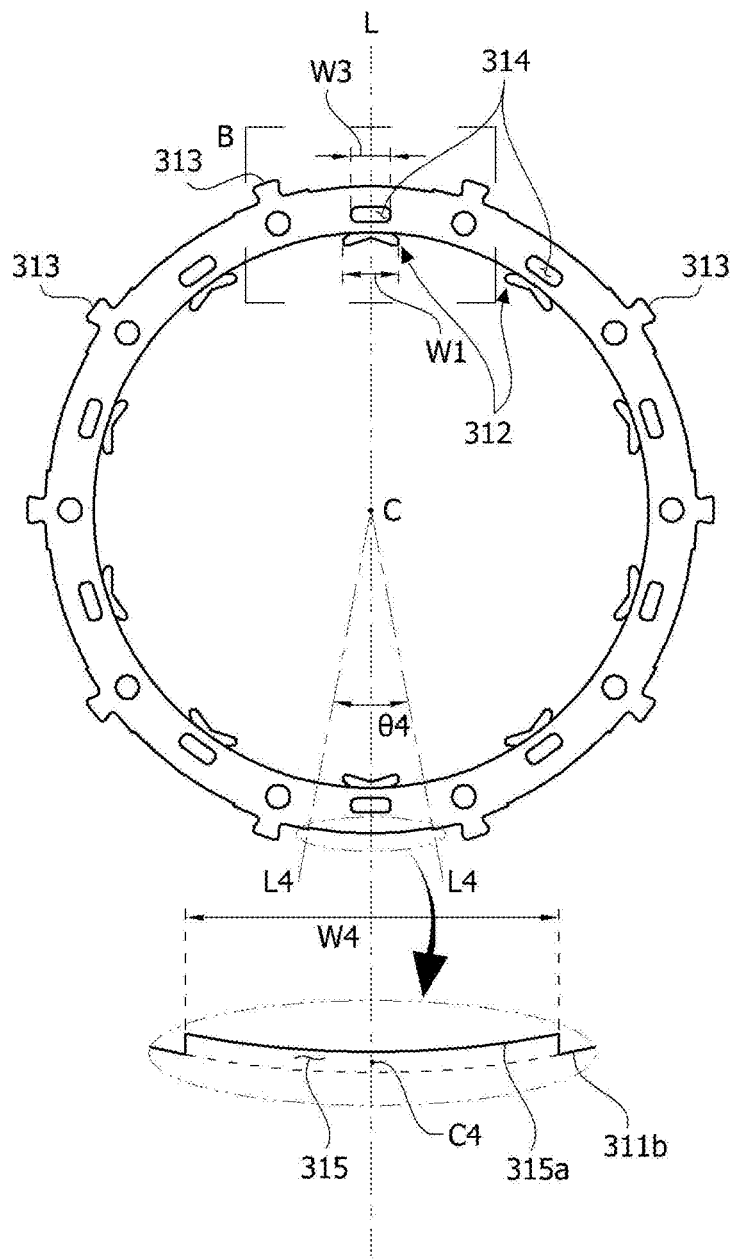
FIG. 8 is a plan view illustrating the rotor core of the rotor disposed in the motor according to the embodiment.
Figure 9:
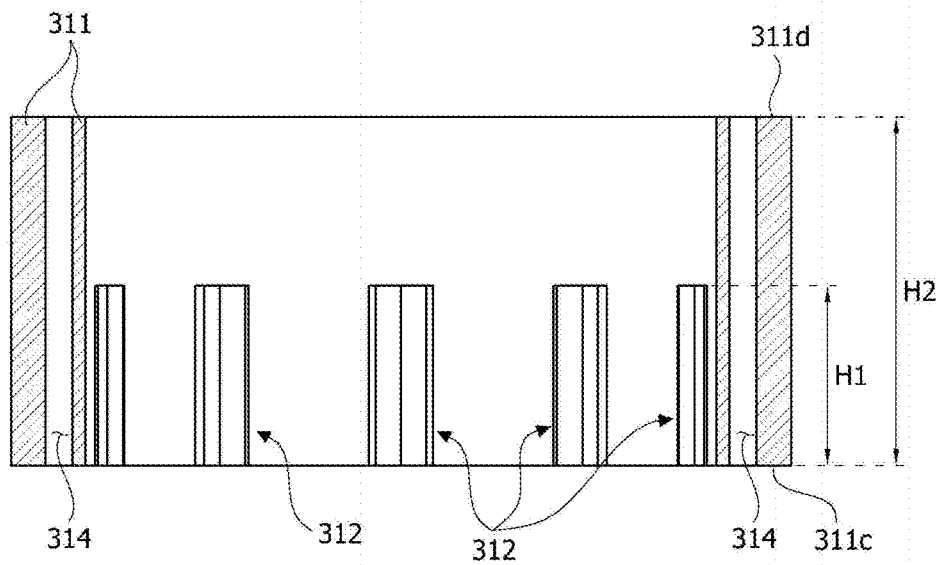
FIG. 9 is a cross-sectional view illustrating the rotor core of the rotor disposed in the motor according to the embodiment.
Figure 10:
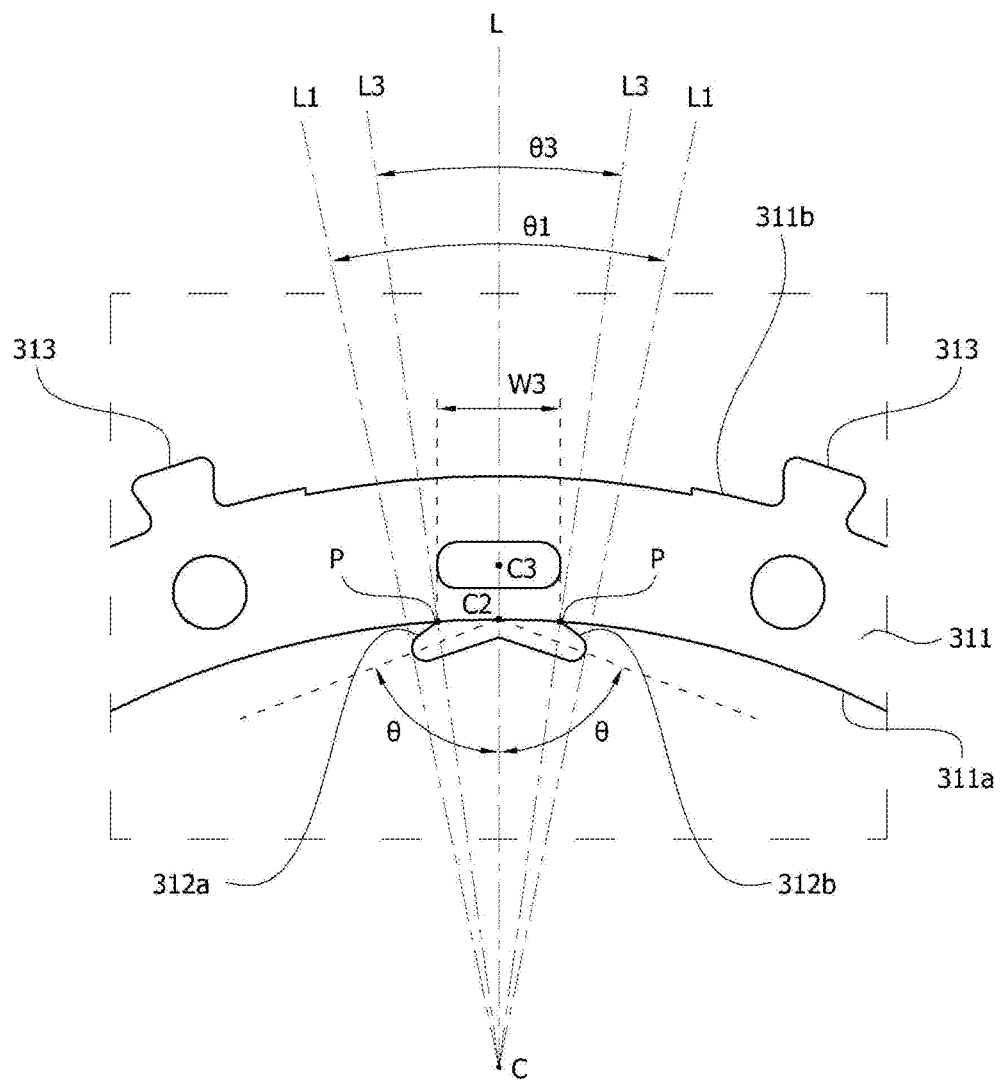
FIG. 10 is an enlarged view illustrating region B of FIG. 9.

FIG. 7 is a perspective view illustrating the rotor core of the rotor disposed in the motor according to the embodiment, FIG. 8 is a plan view illustrating the rotor core of the rotor disposed in the motor according to the embodiment, FIG. 9 is a cross-sectional view illustrating the rotor core of the rotor disposed in the motor according to the embodiment, and FIG. 10 is an enlarged view illustrating region B of FIG. 9.

Referring to FIGS. 7 to 10, the rotor core 310 may include a body 311, protruding portions 312 obliquely protruding inward from an inner circumferential surface 311a of the body 311 at a predetermined angle, and a plurality of guides 313 protruding outward from an outer circumferential surface 311b of the body 311. In addition, the rotor core 310 may further include holes 314 formed in the body 311. In addition, the rotor core 310 may further include grooves 315 concavely formed in the outer circumferential surface 311b of the body 311. In this case, the body 311, the protruding portions 312, and the guides 313 may be integrally formed.

The body 311 may be formed in a pipe shape. For example, when viewed from above, the body 311 may be formed in a ring, circular, or donut shape. In addition, a hole may be formed in a central portion of the body 311 in order to arrange the shaft 500.

The protruding portion 312 may be formed to obliquely protrude inward from the inner circumferential surface 311a of the body 311 at the predetermined angle. As illustrated in FIG. 5, since the protruding portion 312 obliquely protrudes at the predetermined angle, predetermined gaps G1 may be formed between the inner circumferential surface 311a of the body 311 and end portions of the protruding portions 312. In this case, the gap G1 formed between the inner circumferential surface 311a of the body 311 and the end portion of the protruding portion 312 may be referred to as a first gap.

Accordingly, when the shaft 500 is disposed in the hole of the body 311, the protruding portion 312 may come into contact with an outer circumferential surface of the shaft 500. In this case, since the shaft 500 is coupled to the body 311 in a press-fitting manner, the gap G1 may be reduced. For example, in a case in which the rotor core 310 is coupled to the shaft 500 in a press-fitting manner, since a radius of a circle which is a virtual circle connecting the end portions of the protruding portions 312 is less than a radius of the shaft 500, the gap G1 may be reduced when the shaft 500 is press-fitted thereto.

Accordingly, when the shaft 500 is press-fitted and coupled to the hole formed in the rotor core 310, although a press-fitting force is applied to the rotor core 310 in the radial direction, the gaps G1 formed due to the protruding portions 312 perform a buffering function to minimize an amount of change in the outer circumferential surface of the rotor core 310 so that a press-fitting force applied to the magnets 320 attached to the outer circumferential surface of the rotor core 310 is buffered. Accordingly, the protruding portions 312 may minimize the amount of the change in the outer diameter of the rotor core 310 due to the press-fitting force to inhibit separation of the magnets 320.

As illustrated in FIGS. 7 and 8, the protruding portion 312 may be provided as a first protrusion 312a and a second protrusion 312b. However, the protruding portion 312 is not necessarily limited thereto. For example, the protruding portion 312 may be provided as any one protrusion of the first protrusion 312a and the second protrusion 312b.

However, the protruding portion 312 may be provided as the first protrusion 312a and the second protrusion 312b of which end portions obliquely protrude in directions to be spaced apart from each other in the circumferential direction in consideration of a coupling force between the rotor core 310 and the shaft 500.

Referring to FIGS. 8 and 10, each of the first protrusion 312a and the second protrusion 312b may obliquely protrude from the inner circumferential surface 311a of the body 311 at a predetermined angle θ. For example, each of the first protrusion 312a and the second protrusion 312b may form the predetermined angle θ based on a virtual line L passing through the center C of rotor core 310 in the radial direction.

In this case, the end portions of the first protrusion 312a and the second protrusion 312b may be formed to protrude in directions to be spaced apart from each other in the circumferential direction. For example, the first protrusion 312a and the second protrusion 312b may obliquely protrude in different directions in the circumferential direction. In this case, first protrusion 312a and the second protrusion 312b may be symmetrically disposed on the basis of the line L.

Referring to FIG. 6, the end portion of the first protrusion 312a and the end portion of the second protrusion 312b may form a first angle θ1 based on the center C of the rotor core 310, one corner and the other corner of the magnet 320 may form a second angle θ2 based on the center C of the rotor core 310, and the first angle θ1 may be less than the second angle θ2. In this case, the first angle θ1 may be present within the second angle θ2.

In this case, virtual lines L1 connecting the center C of the rotor core 310 and the end portions of the first protrusion 312a and the second protrusion 312b may be formed, and the first angle θ1 may be an acute angle between the lines L1. In addition, virtual lines L2 connecting the center C of the rotor core 310 and one and the other corners of the magnet 320, and the second angle θ2 may be an acute angle between the lines L2.

In this case, a center C1 of the magnet 320 may be disposed on the virtual line L passing through the center C of the rotor core 310 in the radial direction, and the first protrusion 312a and the second protrusion 312b may be symmetrically disposed on the basis of the line L. In addition, a center C2 of the protruding portion 312 formed with the first protrusion 312a and the second protrusion 312b may also be disposed on the line L. In this case, the center C2 of the protruding portion 312 may be a center of a region in which the inner circumferential surface 311a of the body 311 meets the protruding portion 312 in the circumferential direction.

That is, the center C1 of the magnet 320 and the center C2 of the protruding portion 312 may be disposed on the same radial line L. In this case, as illustrated in FIG. 5, a width W1 of the protruding portion 312 is less than a width W2 of the magnet 320. For example, when viewed in the radial direction, the protruding portion 312 may be disposed to overlap one portion of the magnet 320. Accordingly, the press-fitting force applied to the magnet 320 by the shaft 500 in the radial direction may be buffered by the protruding portion 312 and transferred to the magnet 320.

Accordingly, the protruding portion 312 of the rotor 300 allows the shaft 500 to be coupled to the rotor core 310 in the press-fitting manner and also buffers the press-fitting force to inhibit separation of the magnet 320.

The protruding portion 312 may be formed to have a predetermined height in the axial direction based on a lower surface 311c of the body 311. In this case, the height of the protruding portion 312 in the axial direction may be less than the height of the body 311 in the axial direction so that an amount of contact between the protruding portion 312 and the shaft 500 may be reduced.

Referring to FIG. 9, a height H1 of the protruding portion 312 may be less than a height H2 of the body 311 in the axial direction based on the lower surface 311c of the body 311. In this case, the height H2 of the body 311 may be 1.9 to 2.0 times the height H1 of the protruding portion 312. Specifically, the height H2 of the body 311 may be 1.93 times the height H1 of the protruding portion 312. In this case, the height H1 of the protruding portion 312 may be referred to as a first height, and the height H2 of the body 311 may be referred to as a second height.

Accordingly, the contact between the protruding portion 312 and the shaft 500 may be minimized due to the protruding portion 312 formed to have the first height H1 so that the press-fitting force applied to the rotor core 310 may be minimized. In addition, since the second height H2 is formed to be 1.9 to 2.0 times the first height H1, tilting of the shaft 500 due to a force applied to the shaft 500 in the radial direction may be inhibited.

Meanwhile, the end portions of the first protrusion 312a and the second protrusion 312b may be rounded in consideration of being in contact with the shaft 500. Accordingly, the end portions of first protrusion 312a and the second protrusion 312b may be in line-contact with the shaft 500 in the axial direction.

For example, since each of the end portions of the first protrusion 312a and the second protrusion 312b may be formed to have a curved surface having a predetermined curvature, the end portions of the first protrusion 312a and the second protrusion 312b may be in line-contact with the shaft 500 in the axial direction.

The rotor core 310 may include the guides 313 extending and protruding outward from the outer circumferential surface 311b of the body 311. The guides 313 may be integrally formed with the rotor core 310. In this case, the guides 313 may be formed from the lower surface 311c to an upper surface 311d of the body 311 in the axial direction.

The guide 313 guides an arrangement of the magnets 320. Accordingly, the magnet 320 may be disposed between the guides 313. In this case, a protruding length of the guide 313 in the radial direction based on the outer circumferential surface 311b of the rotor core 310 is less than a thickness of the magnet 320 in the radial direction.

In this case, an example in which the rotor core 310 includes the guides 313 is illustrated, but the rotor core 310 is not necessarily limited thereto. For example, the guides 313 may be removed from the rotor core 310. However, in the case in which the guides 313 are formed on the rotor core 310, since a region on which an adhesive member is applied is increased, a fixing force of the magnet 320 may be increased.

The hole 314 may be formed in the body 311. As illustrated in FIG. 9, the hole 314 may be formed to pass through the body 311 in the axial direction. For example, the hole 314 may be formed from the lower surface 311c to the upper surface 311d of the body 311 in the axial direction.

The hole 314 may be disposed between the protruding portion 312 and the magnet 320 in the radial direction.

In addition, when viewed from above, the hole 314 may be formed as a long hole extending in the circumferential direction.

One corner and the other corner of the hole 314 may form a third angle θ3 based on the center C of the rotor core 310 when viewed from above. Accordingly, the first angle θ1 may be greater than the third angle θ3. That is, the third angle θ3 may be less than the first angle θ1, and the third angle θ3 may be present within the first angle θ1.

In this case, virtual lines L3 connecting the center C of the rotor core 310 and one and the other corners of the hole 314 may be formed, and the third angle θ3 may be an acute angle between the lines L3.

Meanwhile, a center C3 of the hole 314 may be disposed on the virtual line L connecting the center C1 of the magnet and the center C of the rotor core 310. In this case, the center C2 of the protruding portion 312 may also be disposed on the virtual line L. In this case, the center C2 of the protruding portion 312 may be the center of the region in which the inner circumferential surface 311a of the body 311 meets the protruding portion 312 in the circumferential direction. For example, the center C2 of the protruding portion 312 may be a center between one point P and the other point P, at which the inner circumferential surface 311a of the body 311 meets the protruding portion 312, of the protruding portion 312 in the circumferential direction.

In addition, a width W3 of the hole 314 may be less than the width W1 of the protruding portion 312. In this case, the width W3 of the hole 314 may be the same as a width between one point P and the other point P, at which the inner circumferential surface 311a of the body 311 meets the protruding portion 312, of the protruding portion 312. Accordingly, the press-fitting force may be transferred to the hole 314 in the radial direction but buffered by the hole 314.

In addition, the hole 314 may have a predetermined width in the radial direction. The width of the hole 314 in the radial direction may be adjusted in consideration of the strength of the body 311 and a buffer force against the press-fitting force.

The groove 315 may be concavely formed inward from the outer circumferential surface 311b of the body 311. Accordingly, an inner surface 315a may be formed to be spaced inward from the outer circumferential surface 311b of the body 311. In this case, the grooves 315 may be formed from the lower surface 311c to the upper surface 311d of the body 311 in the axial direction.

The groove 315 may be disposed outside the hole 314 in the radial direction.

When viewed from above, one corner and the other corner of the groove 315 may form a fourth angle θ4 based on the center C of the rotor core 310. Accordingly, the first angle θ1 may be less than the fourth angle θ4. In this case, the first angle θ1 may be present within the fourth angle θ4. In this case, virtual lines L4 connecting the center C of the rotor core 310 and the one and the other corners of the groove 315 may be formed, and the fourth angle θ4 may be an acute angle between the lines L4.

Meanwhile, a center C4 of the groove 315 may be disposed on the virtual line L connecting the center C1 of the magnet and the center C of the rotor core 310.

In addition, a width W4 of the groove 315 may be greater than the width W1 of the protruding portion 312 or the width W3 of the hole 314. However, the width W4 of the groove 315 may be less than the width W2 of the magnet 320. Accordingly, the press-fitting force may be transferred to the groove 315 in the radial direction but buffered by the groove 315.

Meanwhile, an adhesive member (not shown) may be disposed in the groove 315.

The magnets 320 may be disposed on the outer circumferential surface 311b of the rotor core 310 to be spaced apart from each other at preset intervals. In this case, the magnets 320 may be attached to the outer circumferential surface 311b of the rotor core 310 using the adhesive member such as a bond. In addition, since the adhesive member may fill the groove 315 and be cured, the fixing force of the magnet 320 in the circumferential direction may be improved.

Referring to FIG. 5, since the grooves 315 are formed in the outer circumferential surface 311b of the body 311, a predetermined gap G2 may be formed between an inner side surface 321 of the magnet 320 and the inner surface 315a of the groove 315. In this case, the gap G2 may be referred to as a second gap.

Accordingly, when the shaft 500 is coupled to the body 311 in the press-fitting manner, the gap G2 may be reduced. Accordingly, the press-fitting force applied to the magnet 320 may be buffered by the gap G2. In addition, an amount of change in the outer circumferential surface 311b of the body 311 may be minimized due to the gap G2.

Figure 11:
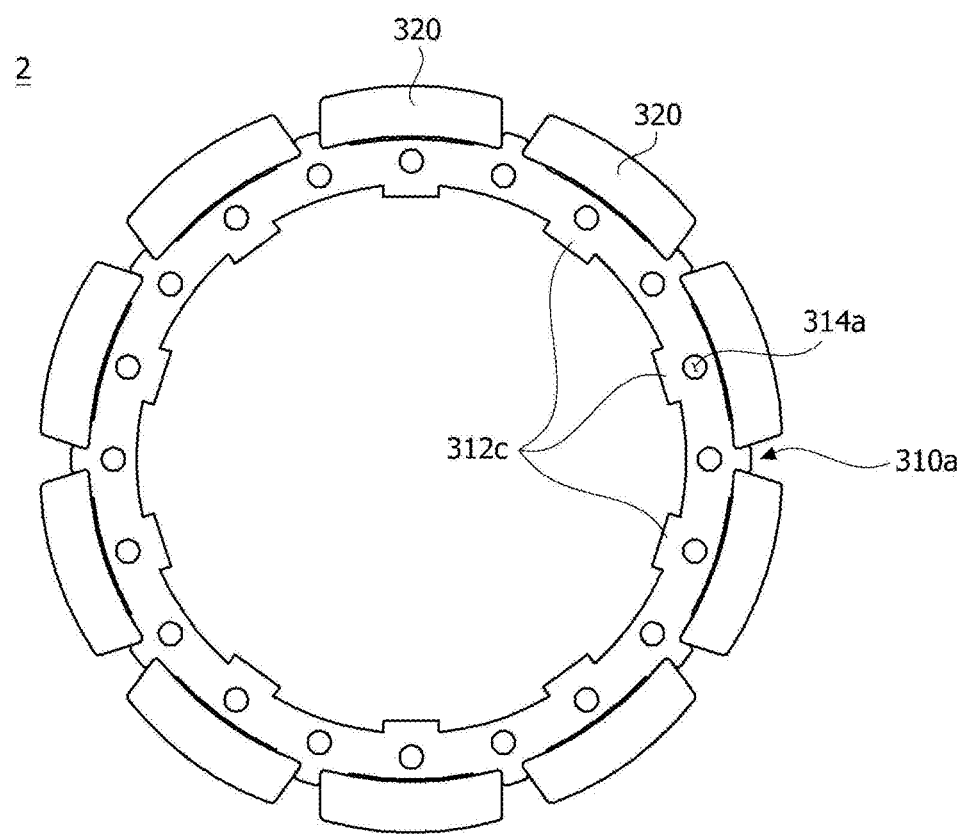
FIG. 11 is a view illustrating a rotor of a motor according to a comparative example.
Figure 12:
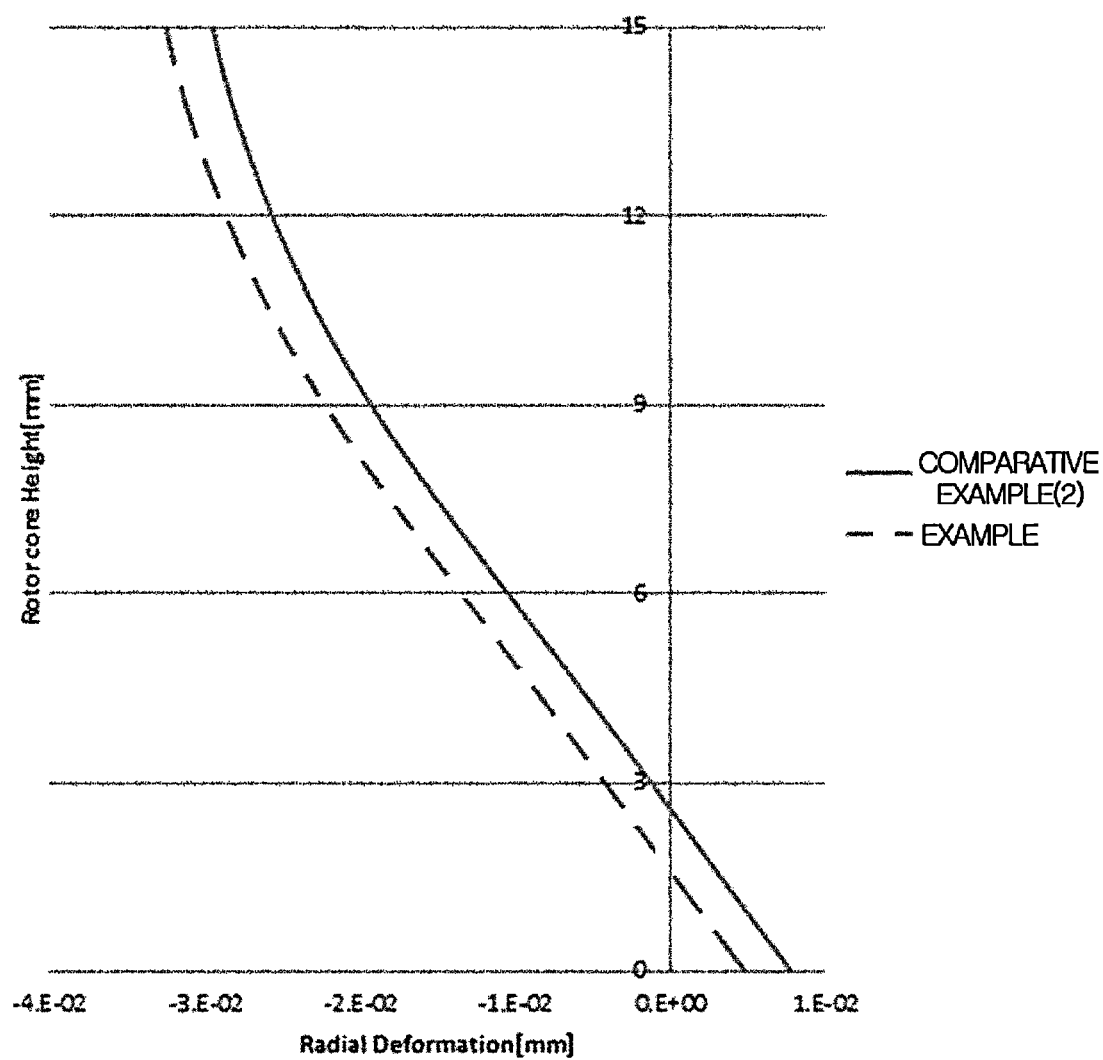
FIG. 12 is a graph showing an amount of change in an outer diameter of the rotor core of the motor according to the comparative example and an amount of change in an outer diameter of the rotor core disposed in the motor according to the embodiment.

FIG. 11 is a view illustrating a rotor of a motor according to a comparative example, and FIG. 12 is a graph showing an amount of change in an outer diameter of the rotor core of the motor according to the comparative example and an amount of change in an outer diameter of the rotor core disposed in the motor according to the embodiment.

Referring to FIG. 11, a rotor disposed in a motor 2 according to the comparative example may include a rotor core 310a and magnets 320 disposed on an outer circumferential surface of the rotor core 310a.

When the rotor disposed in the motor 2 according to the comparative example is compared with the rotor 300 of the motor 1 according to the embodiment, a shape of a protruding portion 312c and a shape of a hole 314a of the motor 2 according to the comparative example are different from those of the motor 1 according to the embodiment. For example, there are differences in points that the protruding portion 312c of the motor 2 according to the comparative example may not buffer a press-fitting force generated when a shaft 500 is press-fitted thereto because of having a quadrilateral shape and the hole 314a has a circular shape and a size different from that of the hole 314 of the motor 1 according to the embodiment.

As illustrated in FIG. 12, it may be seen that there is a difference in amount of change in an outer diameter of a rotor core due to a press-fitting force generated when the shaft 500 is press-fitted thereto. That is, in the rotor core 310 of the motor 1, an amount of change in the outer diameter of the rotor core 310 is further reduced due to the protruding portion 312 and the hole 314 so that the stress applied to the magnet 320 may be further buffered.

In addition, in the rotor core 310 of the motor 1, since the groove 315 is provided in addition to the protruding portion 312 and the hole 314, the amount of the change in the outer diameter of the rotor core 310 due to the press-fitting of the shaft 500 is further reduced so that the stress applied to the magnet 320 may be further reduced. Accordingly, separation of the magnet 320 from the rotor core 310 may be inhibited.

The first can 330 and the second can 340 may protect the rotor core 310 and the magnet 320 from external impacts or physical or chemical stimulations and inhibit foreign materials from being introduced into the rotor core 310 and the magnet 320.

In addition, the first can 330 and the second can 340 inhibit the magnet 320 from being separated from the rotor core 310.

Each of the first can 330 and the second can 340 may be formed in a cup shape in which a hole is formed in a central portion thereof and disposed to cover one of an upper portion and a lower portion of the rotor core 310 to which the magnets 320 are attached. In this case, an end portion of the first can 330 and an end portion of the second can 340 may be disposed to be spaced apart from each other in the axial direction. In this case, the name "can" may be referred to as a cap. Accordingly, the first can 330 may be referred to as a first cap, and the second can 340 may be referred to as a second cap.

In this case, the first can 330 and the second can 340 may be formed in the same shape. Accordingly, since the first can 330 and the second can 340 may be interchangeably used, production costs thereof may be minimized. However, a material of the second can 340 may be different from a material of the first can 330 in consideration of a position of the protruding portion 312. Alternatively, a strength of the second can 340 may be greater than a strength of the first can 330 in the radial direction in consideration of the position of the protruding portion 312. Accordingly, a thickness of the second can 340 in the radial direction may be greater than a thickness of the first can 330 in the radial direction.

Meanwhile, the second can 340 may be disposed to overlap the protruding portion 312 in the radial direction. In this case, the second can 340 may support an outer side surface 322 of the magnet 320. Accordingly, even when the press-fitting force generated due to press-fitting of the shaft 500 is transferred and applied to the magnet 320 through the protruding portion 312 in the radial direction, separation of the magnet 320 is inhibited by the second can 340.

The stator 400 may be disposed inside the housing 100. In this case, the stator 400 may be supported by an inner circumferential surface of the housing 100. In addition, the stator 400 is disposed outside the rotor 300. That is, the rotor 300 may be disposed inside the stator 400.

Referring to FIG. 1, the stator 400 may include a stator core 410, an insulator 420 disposed on the stator core 410, and a coil 430 wound around the insulator 420.

The coil 430 configured to generate a rotational magnetic field may be wound around the stator core 410. In this case, the stator core 410 may be formed as one core or formed by coupling a plurality of divided cores.

The stator core 410 may be formed in a form in which a plurality of thin steel plates are stacked but is not necessary limited thereto. For example, the stator core 410 may also be formed as a single product.

The stator core 410 may include a yoke (not shown) having a cylindrical shape and a plurality of teeth (not shown) protruding from the yoke in the radial direction. In addition, the coil 430 may be wound around the teeth.

The insulator 420 insulates the stator core 410 from the coil 430. Accordingly, the insulator 420 may be disposed between the stator core 410 and the coil 430.

Accordingly, the coil 430 may be wound around the stator core 410 on which the insulator 420 is disposed.

The shaft 500 may be disposed in the housing 100 to be rotatable due to the bearings 10. In addition, the shaft 500 may rotate in conjunction with rotation of the rotor 300.

The bus bar 600 may be disposed on the stator 400.

In addition, the bus bar 600 may be electrically connected to the coil 430 of the stator 400.

The bus bar 600 may include a bus bar body (not shown) and a plurality of terminals (not shown) disposed in the bus bar body. In this case, the bus bar body may be a mold product formed through an injection molding process. In addition, each of the terminals may be electrically connected to the coil 430 of the stator 400.

The sensor part 700 may detect a magnetic force of a sensing magnet installed to be rotatable in conjunction with rotation of the rotor 300 to check the current position of the rotor 300 so as to detect rotation of the shaft 500.

The sensor part 700 may include a sensing magnet assembly 710 and a printed circuit board (PCB) 720.

The sensing magnet assembly 710 is coupled to the shaft 500 to be operated in conjunction with the rotor 300 to detect the position of the rotor 300. In this case, the sensing magnet assembly 710 may include sensing magnets and a sensing plate.

The sensing magnets may include main magnets disposed close to a hole forming an inner circumferential surface in the circumferential direction and sub-magnets disposed at an edge thereof. The main magnets may be disposed similarly to the drive magnets inserted into the rotor 300 of the motor. The sub-magnets are subdivided further when compared to the main magnets so that the number of poles of the sub-magnets is greater than the number of poles of the main magnets. Accordingly, a rotation angle may be more minutely divided and measured due to the sub-magnets, and the motor may be driven more smoothly.

The sensing plate may be formed of a metal material having a disk shape. The sensing magnets may be coupled to an upper surface of the sensing plate. In addition, the sensing plate may be coupled to the shaft 500. In this case, a hole through which the shaft 500 passes may be formed in the sensing plate.

A sensor configured to detect the magnetic force of the sensing magnet may be disposed on the PCB 720. In this case, a Hall integrated circuit (Hall IC) may be provided as the sensor. In addition, the sensor may detect a change in an N-pole and an S-pole of the sensing magnet 610 to generate a sensing signal.

While the present invention has been described with reference to the exemplary embodiments thereof, it will be understood by those skilled in the art that various changes in form and details may be made therein without departing from the spirit and scope of the invention as defined by the appended claims.

REFERENCE NUMERALS

| | |
|---|---|
| 1: MOTOR | 10: BEARING |
| 100: HOUSING | 200: COVER |
| 300: ROTOR | 310: ROTOR CORE |
| 311: BODY | 312: PROTRUDING PORTION |
| 313: GUIDE | 314: HOLE |
| 315: GROOVE | 330: FIRST CAN |
| 340: SECOND CAN | 400: STATOR |
| 410: STATOR CORE | 430: COIL |
| 500: SHAFT | 600: BUS BAR |
| 700: SENSOR PART | |

The invention claimed is:

1. A rotor comprising:

a rotor core; and a plurality of magnets disposed on an outer circumferential surface of the rotor core to be spaced apart from each other, wherein the rotor core includes a body and a protruding portion obliquely protruding inward from an inner circumferential surface of the body at a predetermined angle, and a predetermined gap (G1) is formed between the inner circumferential surface of the body and an end portion of the protruding portion, wherein the protruding portion includes a plurality of protrusions including a first protrusion and a second protrusion that obliquely protrude from the inner circumferential surface of the body at predetermined angles, wherein an end portion of the first protrusion and an end portion of the second protrusion protrude in directions to be spaced apart from each other in a circumferential direction, wherein the first protrusion is closer to the second protrusion than it is to any other protrusion of the plurality of protrusions, and the second protrusion is closer to the first protrusion than it is to any other protrusion of the plurality of protrusions, wherein the first protrusion and the second protrusion both overlap, in a radial direction, a first magnet of the plurality of magnets, and wherein the first protrusion and the second protrusion are symmetrically disposed on the basis of a virtual line connecting a center of the rotor core and a center of the first magnet.

2. The rotor of claim 1, wherein:

the end portion of the first protrusion and the end portion of the second protrusion form a first angle ($\theta1$) based on a center (C) of the rotor core;

one corner and the other corner of the first magnet form a second angle ($\theta2$) based on the center (C) of the rotor core; and the first angle ($\theta1$) is less than the second angle ($\theta2$).

3. The rotor of claim 2, wherein:

a center of the first magnet and a center between the first protrusion and the second protrusion are disposed on the same radial line in the circumferential direction; and a width of the first magnet is greater than a width of the protruding portion.

4. The rotor of claim 1, wherein the rotor core includes a hole formed in the body.

5. The rotor of claim 4, wherein the hole is disposed between the protruding portion and the magnet in the radial direction.

6. The rotor of claim 5, wherein:

the end portion of the first protrusion and the end portion of the second protrusion form a first angle ($\theta1$) based on a center (C) of the rotor core;

one corner and an other corner of the hole form a third angle ($\theta3$) based on the center (C) of the rotor core; and the first angle ($\theta1$) is greater than the third angle ($\theta3$).

7. The rotor of claim 6, wherein a center of the hole is disposed on a virtual line (L) connecting a center of the first magnet and a center of the rotor core.

8. The rotor of claim 6, wherein a width of the hole is the same as a width between one point and another point at which the protruding portion meets the inner circumferential surface of the body in the circumferential direction.

9. The rotor of claim 1, wherein a height (H1) of the protruding portion is less than a height (H2) of the body based on a lower surface of the body in an axial direction.

10. The rotor of claim 1, comprising a first can and a second can that cover an upper portion and a lower portion of the rotor core, to which the magnets are attached, respectively, wherein the second can is disposed to overlap the protruding portion in the radial direction.

11. The rotor of claim 1, wherein:

the rotor core includes a groove concavely formed inward from an outer circumferential surface of the body; and a width of the groove is less than a width of the first magnet.

12. The rotor of claim 1, wherein:

the rotor core includes guides protruding outward from the outer circumferential surface thereof; and the first magnet is disposed between the guides.

13. A rotor comprising:

a rotor core; and a plurality of magnets disposed on an outer circumferential surface of the rotor core to be spaced apart from each other, wherein the rotor core includes a body and a protruding portion obliquely protruding inward from an inner circumferential surface of the body at a predetermined angle, and a predetermined gap (G1) is formed between the inner circumferential surface of the body and an end portion of the protruding portion, wherein the protruding portion includes a first protrusion and a second protrusion that obliquely protrude from the inner circumferential surface of the body at predetermined angles, wherein an end portion of the first protrusion and an end portion of the second protrusion protrude in directions to be spaced apart from each other in a circumferential direction, wherein the rotor core includes a groove concavely formed inward from an outer circumferential surface of the body, wherein a width of the groove is less than a width of a first magnet of the plurality of magnets, and wherein a predetermined gap (G2) is formed between an inner side surface of the first magnet and an inner surface of the groove.

14. A motor comprising:

a shaft;

a rotor in which the shaft is disposed in a central portion thereof; and a stator disposed outside the rotor, wherein the rotor includes a rotor core and a plurality of magnets disposed on an outer circumferential surface of the rotor core to be spaced apart from each other, wherein the rotor core includes a body and a protruding portion obliquely protruding inward from an inner circumferential surface of the body at a predetermined angle, wherein a predetermined gap (G1) is formed between the inner circumferential surface of the body and an end portion of the protruding portion, wherein an outer circumferential surface of the shaft is in contact with the protruding portion, wherein, when the shaft is inserted, the gap (G1) is reduced, wherein the protruding portion includes a plurality of protrusions including a first protrusion and a second protrusion that obliquely protrude from the inner circumferential surface of the body at predetermined angles, wherein the first protrusion is closer to the second protrusion than it is to any other protrusion of the plurality of protrusions, and the second protrusion is closer to the first protrusion than it is to any other protrusion of the plurality of protrusions, wherein the first protrusion and the second protrusion both overlap, in a radial direction, a first magnet of the plurality of magnets, and wherein the first protrusion and the second protrusion are symmetrically disposed on the basis of a virtual line connecting a center of the rotor core and a center of the first magnet.

15. The motor of claim 14, wherein a height (H1) of the protruding portion is less than a height (H2) of the body based on a lower surface of the body in an axial direction.

16. The motor of claim 14, wherein:

an end portion of the first protrusion and an end portion of the second protrusion protrude in directions to be spaced apart from each other in a circumferential direction.

17. The motor of claim 16, wherein:

each of the end portion of the first protrusion and the end portion of the second protrusion is formed to have a curved surface; and the shaft is in line-contact with the first protrusion and the second protrusion in an axial direction.

\* \* \* \* \*